United States Patent
Bernhardsgruetter et al.

(10) Patent No.: US 9,107,537 B2
(45) Date of Patent: Aug. 18, 2015

(54) REFILLABLE MULTI-DOSE CONTAINER APPLICABLE TO A MACHINE FOR PREPARING BEVERAGES

(75) Inventors: Raphael Bernhardsgruetter, St. Gallen (CH); Lucio Scorrano, Yverdon-les-bains (CH); Dieter Falk, Radolfzell (DE)

(73) Assignee: Nestec S.A., Vevey (CH)

( * ) Notice: Subject to any disclaimer, the term of this patent is extended or adjusted under 35 U.S.C. 154(b) by 1300 days.

(21) Appl. No.: 12/666,117

(22) PCT Filed: Jun. 24, 2008

(86) PCT No.: PCT/EP2008/058027
§ 371 (c)(1),
(2), (4) Date: Dec. 22, 2009

(87) PCT Pub. No.: WO2009/000836
PCT Pub. Date: Dec. 31, 2008

(65) Prior Publication Data
US 2010/0175561 A1    Jul. 15, 2010

(30) Foreign Application Priority Data

Jun. 28, 2007    (EP) ..................................... 07111345

(51) Int. Cl.
*A47J 31/043*    (2006.01)
*A47G 19/14*    (2006.01)
(Continued)

(52) U.S. Cl.
CPC .............. *A47J 31/404* (2013.01); *A47J 31/043* (2013.01); *A47G 19/16* (2013.01); *B65D 51/1611* (2013.01)

(58) Field of Classification Search
CPC ........... B65D 2543/00537; B65D 2543/00296; B65D 39/16; B65D 39/00; F01P 11/0238; A47J 27/09; A47J 31/043; A47J 31/02; B01D 11/0203; A47G 19/16; A21B 7/005; B67G 1/0082
USPC ......... 99/292, 299, 306, 323, 348; 222/129.3; 220/281, 360, 367.1, 203.07, 203.04, 220/203.01; 215/260, 262, 364, 355
See application file for complete search history.

(56) References Cited

U.S. PATENT DOCUMENTS 4,271,878 A * 6/1981 Bologa ......................... 141/375
4,544,371 A * 10/1985 Dormandy et al. ......... 604/891.1
(Continued)

FOREIGN PATENT DOCUMENTS

GB    2053423    2/1981
JP    62147591    7/1987
(Continued)

OTHER PUBLICATIONS

International Search Report for International Application No. PCT/EP2008/058027 mailed on Mar. 26, 2009.
(Continued)

*Primary Examiner* — Dana Ross
*Assistant Examiner* — Hemant Matthew
(74) *Attorney, Agent, or Firm* — K&L Gates LLP

(57) ABSTRACT

The invention relates to a refillable multi-dose container (1) for storing a flowable product comprising: —a tank (2) with a top opened extremity (3), —means (4) for closing the top opened extremity (3) of the tank (2), said means being openable by exercising contact pressure on them and closable by stopping contact pressure on them. The invention relates too to a machine comprising such a multi-dose container.

18 Claims, 11 Drawing Sheets

(51) Int. Cl.
*B65D 51/16* (2006.01)
*A47J 31/40* (2006.01)
*A47G 19/16* (2006.01)

(56) References Cited

U.S. PATENT DOCUMENTS

| | | | |
|---|---|---|---|
| 4,649,042 A * | 3/1987 | Davis et al. | 424/430 |
| 5,071,096 A * | 12/1991 | Hartman et al. | 248/154 |
| 5,297,600 A * | 3/1994 | Downes et al. | 141/364 |
| 5,482,095 A * | 1/1996 | de Chollet | 141/380 |
| 6,279,460 B1 * | 8/2001 | Pope | 99/299 |
| 6,502,711 B1 * | 1/2003 | Mc Rae | 220/23.4 |
| 6,877,639 B1 * | 4/2005 | Hanson | 222/158 |
| 7,415,996 B2 * | 8/2008 | Favreau | 141/364 |
| 2003/0005826 A1 * | 1/2003 | Sargent et al. | 99/279 |
| 2003/0209151 A1 * | 11/2003 | Mordini et al. | 99/323 |
| 2005/0115415 A1 * | 6/2005 | Arrick et al. | 99/348 |
| 2005/0263523 A1 * | 12/2005 | Moss | 220/229 |

FOREIGN PATENT DOCUMENTS

| | | |
|---|---|---|
| WO | WO8912416 | 12/1989 |
| WO | WO2004041043 | 5/2004 |

OTHER PUBLICATIONS

Written Opinion for International Application No. PCT/EP2008/058027 mailed on Mar. 26, 2009.

* cited by examiner

REFILLABLE MULTI-DOSE CONTAINER APPLICABLE TO A MACHINE FOR PREPARING BEVERAGES

The present invention relates to a refillable multi-dose container used for storing a flowable product, like a beverage concentrate, said container being usable as a reservoir in a coffee machine.

Various automated beverage machines for making hot or cold beverage products are known in the art. In a conventional beverage machine, a metered amount of watersoluble beverage powder, stored in powder refillable tank, and a metered amount of hot or cold water, supplied from a water source, is conveyed into a mixing chamber to produce a beverage or food, which is then dispensed into a cup and served. The refilling of tanks consists in pouring the powder from disposable powder bag type packages for example gusset bags with zipper for re-open and re-close. During this operation, the operator encounters several problems. The first one concerns a significant loss of powder during the transfer of the powder from the refilling tank to the tank to be refilled. As a consequence a certain quantity of powder is loss and there is also an important dusting of the coffee machine by the powder that has fallen out of the tank. A periodic cleaning of the machine is rendered necessary to avoid a dirty look to the machine as well as to avoid hygiene problems. An other problem is due to the contact and stirring of the powder with air when it flows from one container to the other: it can create a problem of hygiene due to possible contamination with the outside environment, especially, when air and water sensitive powders are used and even more in countries where an important humidity and high temperatures occur. Moreover, the contact and stirring generally causes a loss of aroma of the transferred coffee powder in air. Besides, this mixing of dry powder, which can be a highly hygroscopic material, can lead to the formation of lumps and cakes that prevent gravity flow and transport of the powder inside the machine. Lastly, it is important to maintain the absence of contact of the powder with the atmosphere once it has been transferred in the refilled tank: the closure of this tank must be so rapid and efficient that air cannot ingress inside the tank.

There exists also problems relative to the coffee powder refilling bags used to refill the coffee machine tanks. One problem is linked to the fact that the machines are often tuned in order to provide the best coffee beverage with a specific coffee powder. If an erroneous type of coffee powder is refilled in the machine, it would then lead to a less quality beverage which would disappoint the consumer. It would be appreciable to provide the coffee machine with a tank enabling its refilling only with coffee powder refilling bags specifically adapted to the machine so as to guarantee the best beverage dispensing. These problems can also occur with other types of flowable products like a liquid, a paste or a gel.

Therefore, there is need for a satisfactory system, especially adapted for small food or beverage dispensing machine for an office or home, that would allow the refilling of such a machine with a high level of cleanliness and with limited contact with atmosphere and only with a powder specifically adapted to said machine. The system should also aim at storing coffee powder in the machine with limited contact with atmosphere.

The present invention now resolves these deficiencies.

In a first aspect, the invention relates to a refillable multi-dose container for storing a flowable product comprising:

a tank with a top opened extremity, means for closing the top opened extremity of the tank, said means being openable by exercising contact pressure on them and closable by stopping contact pressure on them.

The container of the present invention is foreseen for storing a flowable product that can be a powder, a liquid, a gel or a paste. The container can be used to deliver individual doses of flowable product for a specific application and aims at storing this product before it is dosed; it is why it is defined as a multi-dose container.

Firstly this container comprises a tank of which function is to store the flowable product. This tank can be of any form. It can be designed with a dissymmetrical form in order to force the operator to place it according to a specific orientation in a dispenser, for example for having the container cooperate with motor coupling means. According to the invention, the top extremity of this tank is opened for enabling refilling. This opening of the top opened extremity can present any form either circular, oval, square, . . . . This form can also be dependent from and correspond to the form of the container outlet used for refilling the refillable multi-dose container, for example for avoiding the erroneous refilling with a wrong product. In its simpler and easier form, it is circular.

Secondly the container comprises also means for closing the top opened extremity of the tank. These means for closing the top opened extremity of the tank are openable by exercising a contact pressure on them, usually by exercising a vertical downward oriented contact pressure on them. These means are also closable by stopping contact pressure on them, which means that at rest, when no contact pressure is exercised on them, these means close the top opened extremity of the tank. This state corresponds to the storing the flowable product in the tank, once it is filled with product and closed to the atmosphere to preserve the product. The other state, where a pressure is exercised on the means for closing the top opened extremity of the tank corresponds to the refilling the tank with the flowable product, the top opened extremity being free for the passage of the product.

In the preferred embodiment of the present invention, the means for closing the top opened extremity of the tank comprise several flexible tongues, each tongue having a fixed extremity and an other free extremity, the form and the orientation of said free extremities being such that they close the top opened extremity of the tank at rest and that they move away from one another or that they move away from the top opened extremity of the tank under a contact pressure. The fixed extremities of the flexible tongues are usually fixed on the edge of the top opened extremity of the tank, for example they can all be fixed on a ring that can be placed in the top opened extremity of tank by screwing or by a snap-action fitting. This fixing is preferably tight in order to avoid any air ingress or loss of product components (aromas) through it. An other extremity of the tongues is free and then movable. The form and the orientation of the tongues are such that at rest they form a fully surface devoid of aperture between the tongues. At least all the edges of the tongues touch each other or overlap each other. Yet the overlapping must not be too important: the tongues should be able to diverge from one another further to a direct contact pressure on them in order to create apertures between them for letting the flowable product flow through. Preferably, at rest the whole tongues can form a cone, the top of which being oriented to the interior side to the tank. Each tongue can present the same form that is a triangular form, a side of the triangle being attached on the side of the top opened extremity edge, the two other sides touching the two other next tongues sides, and the opposite free point of the triangle joining all the other tongues free point at the centre of the top opened extremity. When a pressure is applied on the tongues, their free extremities move away from one another and clear a central passage for the flow of product.

The tongues are preferably in a material enabling them to bend and to snap back rapidly without breaking. Such a material can be a gum or a resilient plastic. The tongues can also be made of a current plastic and incorporate bending means like a hinge at their fixed extremities.

The refillable multi-dose container of the invention can comprise a cover above the tank top opened extremity to increase the air tightness of the container once it has been refilled.

In a first mode, the means for closing the top opened extremity of the tank can comprise two sets of several flexible tongues, each set of flexible tongues forming a cone with pierced apertures and the two sets being assembled one to the other so that the tongues of each set recover the pierced apertures of the other set. According to this mode, the closure of the container during the storing step is highly efficient, because due to the overlapping of the two cones on the apertures of each other, there is absolutely no possible ingress of the atmosphere inside the tank. Whereas in the case where tongues form only one cone, it is difficult to produce a cone where tongues perfectly adjust one to each other at rest avoiding the presence of a small aperture. In a specific variant of the first mode, one set of flexible tongues can form a cone presenting wider pierced apertures than the other set of flexible tongues. Usually all the tongues of a same set of tongues present the same regular form and are equally distributed around the top opened extremity of the tank and then the apertures either. The choice of the dimensions and forms of the tongues and the apertures is defined in order to get a sufficient distance and creation of free spaces between the tongues when a pressure contact is exercised on them. A pressure for pushing the free extremities of the tongues several millimeters downwards should be sufficient to have the tongues no more covering the pierced apertures and to create apertures for the passage of the flowable product.

In a second mode, the means for closing the top opened extremity of the tank can comprise a fixed central piece in contact with the free extremities of the flexible tongues. This central piece is fixed which means that it cannot be moved either when a pressure contact is exercised on it or not. It presents a sufficient section so as prevent the formation of a unique aperture at the centre of the top opened extremities when the tongues diverge one from the other. On the contrary, it enables the formation of several independent apertures. The central piece can present any shape. The form of a conical shaped part or a big needle is useful for breaking the flow of flowable product and distributing it in the different apertures between the tongues.

This second mode is especially adapted for the storing of powder and particularly for powder presenting such a granulometry that their bulking angle is important. It has effectively been noticed that some powders could not easily refill the container of the invention although their volume is inferior to the volume of the tank of the container, due to the fact that the powder cone top produced by the free flowing of the powder in the cone overlaps the top opened extremity of the tank. For such powders, the refilling is not proper because powder stays above the flexible tongues when pressure is no more applied on them. The second mode provides a solution for this problem: due to the presence of the fixed central piece, the pressure contact exercised on the tongues do not create a central and unique aperture but several independent smaller apertures. Then powder is introduced in the tank through these several apertures, each creating a cone of powder at different locations inside the tank, said cone presenting a smallest vertical size than the unique central cone created by only one aperture.

The previous problem of high bulking angle powders can also be solved by a refillable multi-dose container of the invention according to third mode, where:

the top opened extremity of the tank is a cylinder neck presenting:
  an external thread for cooperating with a thread of a cover, and
  an internal thread for cooperating with a thread on the means for closing the top opened extremity of the tank, and
the cover and the means for closing the top opened extremity of the tank present connection means so that when the cover is respectively screwed up or down around the cylinder neck, the means for closing the top opened extremity of the tank are screwed up or down inside the cylinder neck, and
said connection means being releasable when the cover and the means for closing the top opened extremity of the tank are screwed up to their highest position.

The embodiment of this third mode enables the raising of the vertical dimension of the cylinder neck once the container is refilled. Actually, for refilling, the cover of the tank is removed by screwing it up. Due to the fact that the cover is connected to the means for closing the top opened extremity of the tank, these ones are simultaneously screwed up until they emerge at the top of the cylinder neck. At this point, the cover is no more screwed to the external part of the cylinder neck and the connection means with the means for closing the top opened extremity of the tank are released; consequently the means for closing the top opened extremity of the tank are placed at the top of the tank cylinder neck and the powder that is refilled in the container flows from a highest level inside the container compared to containers where the means for closing the top opened extremity of the tank cannot be moved up. Once the refilling is realised, the cover is put again in connection with the means for closing the top opened extremity of the tank and they are screwed down respectively around and inside the cylinder neck. The means for closing the top opened extremity of the tank will then slowly cover the top of the powder bulking cone.

In a fourth mode, the fixed extremities of the tongues are hooked near the bottom of the tank. In the preferred embodiment of this fourth mode, the means for closing the top opened extremity of the tank comprise several flexible tongues and the free extremities of the flexible tongues support clogging means, the form and the orientation of said clogging means being such that they close the top opened extremity of the tank. The closing of the opened extremity of the tank by the clogging means can be obtained by the exact fitting of the surface or edge of the clogging means with the edge of the opening of the top opened extremity of the tank. The elongated flexible tongues and the clogging means are usually placed inside the vessel volume. Then the clogging means close the top opened extremity of the tank from the inside of the tank. The preferred clogging means consist in a dome-shaped cup especially when the opening of the top opened extremity of the tank presents a circular form. Then this dome-shaped cup is oriented so that the exterior surface of the cup sticks to the edge of the opening of the top opened extremity of the tank. With this aim, the length of the elongated flexible tongues is generally set so that they make the clogging means fit to the top opened extremity of the tank. In a specific mode clogging means present fins on their upper surface. Such fins can enable a better contact for the application of a contact pressure on the clogging means.

Whatever the form of the means for closing the top opened extremity of the tank, the tank of the refillable multi-dose container of the present invention presents usually a bottom extremity that is opened in order to cooperate with a dispenser and according to the preferred embodiment in order to cooperate with the dosing means of a dispenser. Then the refillable multi-dose container enables the momentary storing of the flowable product inside the refillable multi-dose container of a dispenser that delivers doses of product once it is required. Preferably the tank bottom extremity is directly connected to the dosing means: the bottom opened extremity of the tank and the dosing means casing usually fit into each other. Due to this fitting the bottom extremity of the tank is closed by the upper part of the dosing means. The dosing means takes off product doses from the tank to feed the dispenser, for example the mixing chamber of a coffee dispenser. The tank can also be indirectly connected to the dosing means for example by the means of a funnel. The dosing means can be of any known types like a screw, an auger, a barrel, a sliding chamber, a rotary pierced disc, a peristaltic pump for liquid and paste and the like for delivering a dose of flowable product to the dispenser.

When a refillable multi-dose container according to the fourth mode of the present invention is implemented, the fixed extremity of the flexible tongues can be fixed on the casing of the dosing means near the bottom extremity of the tank or directly to the tank, preferably to the bottom of the tank.

In a second aspect the invention concerns a machine for preparing beverage from a flowable beverage ingredient comprising:
 a refillable multi-dose container as described above,
 a dosing unit comprising dosing means,
 diluent feeding means,
 means for mixing a dose of flowable beverage ingredient and diluent.

With a machine according to the present invention, it is possible to provide a soluble flowable beverage ingredient to a beverage dispensing machine. Therein, the soluble flowable beverage ingredient is preferably discharged into a mixing chamber of such a machine and thus, a liquid such as water can be made to interact with the soluble ingredient in order to form a beverage.

The dosing unit cooperates with the bottom opened extremity of the tank so that the flowable product stored in the tank enters the dosing means. The dosing means are usually a rotating element connected to the refillable multi-dose container as described above. The dosing unit casing can comprise cooperating means for locking or unlocking the refillable multi-dose container on the coffee machine. Then the container and the dosing unit can be either connected to each other when they are used or isolated for the purpose of washing for example. The dosing unit casing can also comprise cooperating means for locking or unlocking the system on the machine. Then the container and the dosing unit are simultaneously removable from the machine for washing of the system or for refilling the system with a flowable product; in small kitchens it is effectively likeable to be able to refill the powder container when it is dissociated from the machine for example when there is only limited place above the beverage machine.

According to the present invention, when the refillable multi-dose container of the machine is filled with a flowable product and is locked on the coffee machine for storing and dosing the flowable product, the refillable multi-dose container is totally closed at its bottom by the dosing unit and at its top by means for closing the top opened extremity, then the flowable product properties are preserved—for example the aroma of a coffee powder. The closure of the tank is systematic and does not depend from the operator who in the prior art could forget to place a cap on the container opening after having refilled the container.

When the refillable multi-dose container of the machine is empty, it cannot be refilled with flowable product without being connected to the dosing unit of the machine since the both extremities of the container alone are opened. When the container is connected to the dosing unit, its both extremities are closed, but the top opened end of the container can be opened by exercising a contact pressure on it. Then, the container of the machine cannot be refilled easily for example by pouring a powder from a powder bag above the top end of container since the weight of the powder would not be sufficient to open the container top closing means. The machine of the invention can only be refilled by means that can exercise a pressure contact on the container top closing means in order to open them and let powder falls inside the container.

Often coffee powder machine use dosing means are composed of three disks: a first disk in contact with the powder storing container comprising an aperture for taking powder out of the container, a second disk for metering the powder taken out by the first part, a third disk presenting an aperture for discharging the metered dose of powder. These three disks are turn around the same axis. The fourth mode of the multi-dose container of the present invention with the fixed extremity of the flexible tongues being fixed on the casing of the dosing means near the bottom extremity of the tank or to the bottom of the tank can help for a good setting of the first disk inside the bottom part of the container. Then in the absence of the flexible tongues inside the tank, the first disk cannot work correctly; consequently the machine operator would be prevented from using the tank without the flexible tongues for example for directly pouring a powder from a powder bag above the top extremity of the tank.

In a third aspect the invention concerns a system for preparing beverages by mixing a flowable beverage concentrate with a diluent comprising:
 a machine comprising:
 a refillable multi-dose container as described above,
 a dosing unit comprising dosing means,
 diluent feeding means,
 means for mixing a dose of flowable beverage concentrate and the diluent,
 a container for storing the flowable beverage concentrate and refilling the refillable multi-dose container of the machine, said container comprising:
 a vessel presenting a closed end and an opened end,
 a hopper placed inside the vessel and tapering to a discharge outlet in direction of the vessel opened end, said discharge outlet being able to push the means for closing the top opened extremity of the tank of the refillable multi-dose container.

The container for storing the flowable beverage concentrate comprises mainly a vessel with a closed end and an opened end; its function is to receive and store the bulk material. Any shape of vessel could be used. The section of the vessel can be circular, oval, square, or the like. The form and the size of the section can vary along the length of the vessel to provide a better handling of the container or for providing a marketing appeal. In a preferred embodiment of the present invention the vessel is a cylinder presenting a round section or an oval section; these forms enable easy manufacturing, easy storing and easy handling. The vessel can be made of at least a material chosen between: plastic, cardboard paper, aluminium or a combination and/or laminate of such materials. The preferred material is a laminate of sheets of paper, polyethylene, aluminium, polyethylene terephthalate and polyethylene according to this order. These materials are preferred as they lead to a low weight vessel, yet any other materials could be used to make the vessel. These materials should present a good humidity barrier and, optionally, good oxygen barrier. Depending on the nature of the bulk material that is intended to be stored inside, these materials can also present UV rays- and light-barrier properties. In a special embodiment the closed end of the vessel can be at least partially transparent by using for example a transparent plastic. Such a transparent end enables the control of the level of the remaining bulk material inside the container when this one is used. This transparent part of the vessel can also be placed near the opened end of the vessel with the same purpose. Preferably the opened end of the vessel presents a flange. This flange is useful for fixing a tearable membrane on the container opened end.

The container for storing the flowable beverage concentrate comprises a hopper which function is to enable the unloading of the bulk material from the vessel outside of the container. This hopper or funnel-shaped receptacle enables the bulk material to fall by gravity into a receptacle placed at the opened end of the vessel. The hopper is totally placed inside the vessel and directed so that it tapers in direction of the vessel opened end; then its tapered end, corresponding to the hopper discharge outlet, faces the opened end of the vessel. Due to the fact that the hopper is totally placed inside the vessel volume, its tapered end is either at most in the same plane as the opened end of the vessel or recessed inside the vessel volume. On account of the relative positioning of the hopper and the vessel, a groove extends between the wall of the hopper and the wall of the vessel along all the periphery of the hopper discharge outlet.

The hopper is usually positioned inside the vessel near the opened end of the vessel in order to let the most important volume of the vessel for storing the bulk material. The hopper can be fixed in the vessel by heat-sealing, by high frequency adhesion, with an adhesive or the like. The hopper can present an outer skirt presenting the same form as the vessel, said skirt being able to fit inside the vessel and to position the hopper inside the vessel, for example by leaning on it. This skirt can present a stopping edge able to lean on the edge of the opened end of the vessel in order to avoid the hopper to slide.

The hopper can present any form. It usually presents a symmetric form preferably a circular form but it can also presents a specific form similar to the opening of the tank to be refilled with the container; this specific form can avoid the refilling of the tank with a product that is not adapted for. According to a preferred embodiment, the hopper has a frusto-conical shape.

The tapering angle of the hopper may depend from the nature and the granulometry of the bulk material. For a hydrosoluble coffee powder, the hopper usually presents a tapering angle $\alpha$ of at least 10° and at most 80°, preferably comprised between 15 and 50°, the tapering angle corresponding to the angle between the hopper tapering wall and the hopper central axis. Generally, for the storage of powders, the finer or denser is the powder, the steeper is the tapering angle (around 20°) and the wider is the hopper discharge outlet. And the bigger are the powder particles or lighter is the powder, the flatter is the tapering angle (around 45°) and the smaller is the hopper discharge outlet.

In a preferred embodiment, the hopper comprises a bulk material guiding device coupled to the tapered end of the hopper. Said guiding device may be for example a cylinder. According to this embodiment the outlet of the guiding device forms the hopper discharge outlet in place of the hopper tapered end. Then, when this preferred embodiment is implemented, the terms "hopper discharge outlet" mean the guiding device outlet. According to the invention, the whole of the hopper and its bulk material guiding device must be in the volume of the vessel and the guiding device outlet is closed by the tearable membrane. The hopper is preferably made of plastic like high-density polyethylene polypropylene.

Preferably the discharge outlet of the container for storing the flowable beverage concentrate presents a section inferior to the section of the tank top opened extremity of the refillable multi-dose container of the machine so that the discharge outlet is able to push said means that close the top opened extremity of the refillable container.

The refillable multi-dose container is refilled by pushing the discharge outlet of the container for storing the flowable beverage concentrate against the means for closing the top opened extremity of the tank of the refillable multi-dose container in order to open the top opened extremity of the tank. When the means for closing the top opened extremity of the tank of the refillable multi-dose container comprise several flexible tongues closing the top opened extremity of the tank, the application of the discharge outlet of the hopper on the blades causes their free extremities to subside. When subsiding, the free extremities of the blades deflect from each other which creates gaps between them and consequently the opening of the top opened extremity of the tank. The flowable product poured from the discharge outlet of the refilling container can flow between the blades.

According to a specific variant, the top opened extremity of the refillable multi-dose container of the present invention can present screw threads cooperating screw threads of the refilling container in order to improve the targeting.

According to the preferred embodiment, the container for storing the flowable beverage ingredient comprises a tearable membrane that closes simultaneously the hopper and the vessel. The tearable membrane closes the hopper inside the vessel volume. The tearable membrane is in contact with the tapered end of the hopper or the discharge outlet of the bulk material guiding device according to the above preferred embodiment. The tearable membrane aims at closing the container when it stores the bulk material. Preferably, the membrane is tearable by contact pressure on its surface. Such a tearable function can be obtained by making small perforations through the membrane that would enable the tear of the membrane. Then the membrane can present tear lines. It has been proved that when tear lines are straight lines intersecting at the centre of the membrane better opening of the membrane is obtained and better unloading of the bulk material is possible. Yet any other form of tear lines can be used. The membrane may be made of any material that is tearable, this can be at least a material chosen between: paper, aluminium, polymer sheets and combination thereof. The preferred membrane is a laminate of sheets of paper, polyethylene, aluminium and polyethylene according to this order.

This tearable membrane is broken when it is pressed against the means for closing the top opened extremity of the tank of the refillable multi-dose container in order to open the top opened extremity of the tank. This embodiment enables the storing of the flowable product inside the storing container until the moment where the flowable product is transferred in the refillable multi-dose container, the contact of the product with the air is minimized.

According to a first variant of the container for storing the flowable beverage ingredient, the discharge outlet section of the hopper can be substantially in the plane of the opened end section of the vessel. This common plane is usually perpendicular to the main axis of the hopper. According to this first mode, the tearable membrane simultaneously covers the discharge outlet of the hopper and the opened end of the vessel. In the first mode, the tearable membrane closes simultaneously the opened end of the vessel and the discharge outlet (either the hopper tapered end or the outlet of the guiding device) placed in the same plane. The membrane is then placed in this specific plane common to the opened end of the vessel and the discharge outlet.

According to a second variant of the container for storing the flowable beverage ingredient, the edge of the discharge outlet of the hopper can be recessed inside the vessel. The edge of the hopper discharge outlet is set back from the vessel opened end. In this second mode, the tearable membrane covers the edge of the discharge outlet of the hopper and is connected to the inner wall of the vessel.

The different elements of the container for storing the flowable beverage ingredient may be connected by permanent or detachable means. Permanent means may be designed to be sealing, welding, bonding, non-reversible clipping means or other means. Detachable means may mean a container formed of a threaded portion or equivalent complementary mechanical engagement means on one of the elements of the container which collaborate with a threaded portion or complementary mechanical engagement means belonging to another element of the container.

According to the third aspect embodiment of the present invention, the container for storing the flowable beverage ingredient is usually filled with coffee powder. Yet, this type of container may be used for the storing and unloading of any other beverage bulk material, especially material that are sensible to the air and must be transferred from the container to another recipient with limited contact with the air. Food material may be any food concentrate intended to reconstitute a hot or cold, frothy or non-frothy drink. For example, the bulk material may be a powder of soluble milk, coffee, cocoa, tea or a combination thereof. Other powdered foods such as dried mashed potatoes or other dried foods, sauce or gravy powders, soup powders or the like may also be used in this invention.

The filling of the vessel part of the container for storing the flowable beverage ingredient with the bulk material to be stored inside is generally realised on the container of which closed end has not yet been closed but for which all the other elements (hopper, membrane, eventually a protection cap above the membrane) are already present and assembled. Once the bulk material has been filled inside, the vessel is closed in a definitive way at its closed end.

Once the container for storing the flowable beverage ingredient has been used, the tearable membrane is pierced to unload the bulk material and the container can no more be used. The container is disposed when it is empty.

According to a specific embodiment, a part of the vessel can be a flexible pouch. This flexible pouch corresponds usually to the closed end of the vessel, whereas the rest of the vessel is rigid for enabling the relative cooperation of the hopper, the vessel and the membrane.

Lastly the invention also applies to a system comprising:
a machine for processing a bulk material comprising:
a refillable multi-dose container as described above,
a dosing unit comprising dosing means,
means for processing a dose of bulk material,
a container for storing the bulk material and refilling the refillable multi-dose container of the machine, said container comprising:

a vessel presenting a closed end and an opened end,
a hopper placed inside the vessel and tapering to a discharge outlet in direction of the vessel opened end, said discharge outlet being able to push the means for closing the top opened extremity of the tank of the refillable multi-dose container.

Effectively the container for storing the bulk material as described above may be used for the storing and unloading of any other bulk material than a beverage powder either in food or non food area. The container can store pharmaceutical compounds or chemical compounds that must be fed in a machine tank with limited contact with air and in a rapid way. Such machines can be packaging machines or process machines comprising a tank of bulk material, dosing means for taking and eventually metering the bulk material and leading it to means for processing it.

The objects of the present invention present several advantages. They provide an improved solution for storing flowable product like coffee powder in a machine since it enables the systematic closure of the flowable product tank when it comprises flowable product. Besides, the invention avoids the refilling of the tank of the machine with a refilling container that is not adapted to open the closing means of the tank; in this way only flowable products for which the machine is tuned can be introduced in the tank. The cooperation between the refillable multi-dose container and the container for storing the flowable product enables a refilling without loss of product outside the tank. Besides the containers avoid the contact of the product with the atmosphere which can be of paramount importance for a material like coffee powder avoiding its loss of aroma.

BRIEF DESCRIPTION OF THE DRAWINGS

The characteristics and advantages of the invention will be better understood in relation to the figures which follow.

DETAILED DESCRIPTION OF THE DRAWINGS

Figure 1:
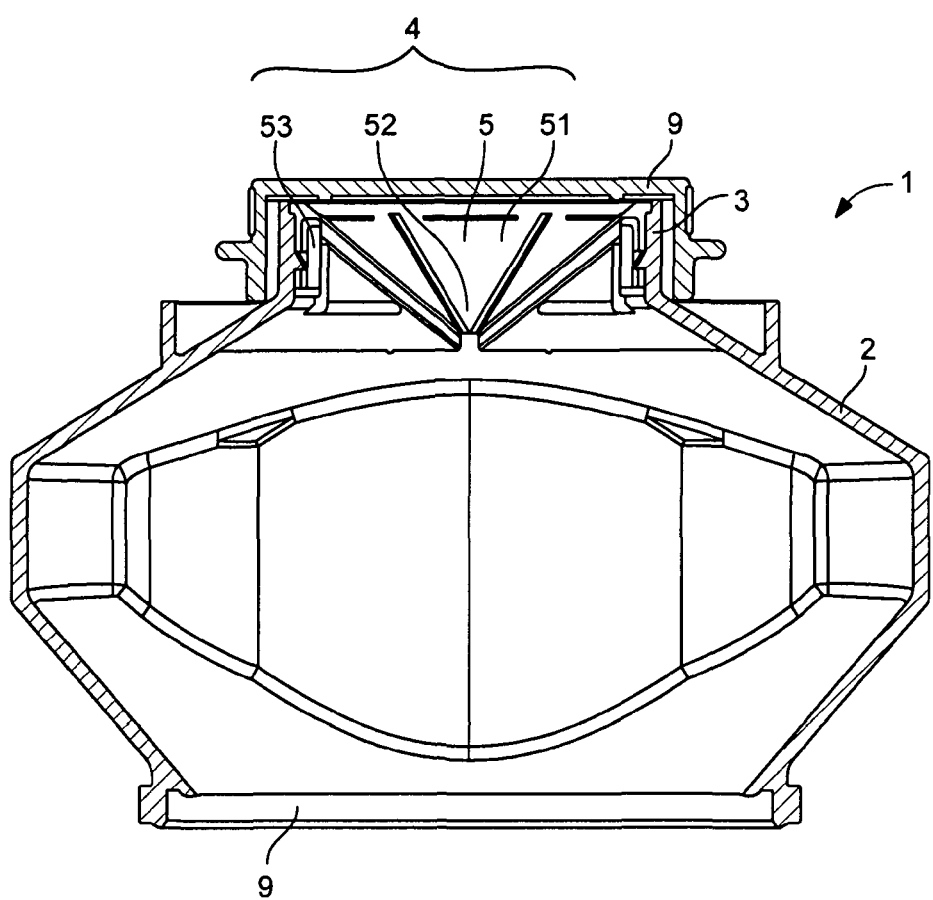
FIG. 1 is a sectional side view of the refillable multi-dose container according to the present invention.
Figure 2:
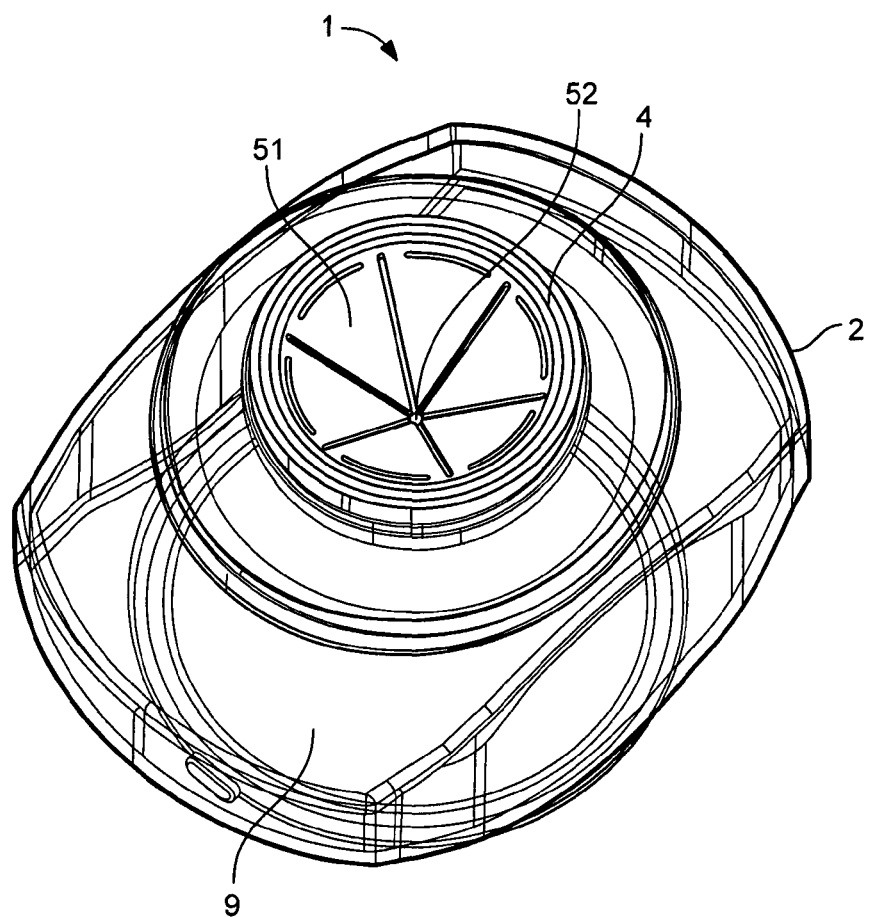
FIG. 2 is a perspective top view of the refillable multi-dose container according to the present invention.

FIGS. 1 and 2 illustrate the refillable multi-dose container 1 according to the present invention. This container comprises a tank 2 presenting a top opened extremity 3 having the form of a cylinder neck in which extend the means 4 for closing this top opened extremity. These means 4 closing this top opened extremity consist in six flexible tongues 5 presenting the general form of triangle, of which one part 51 is fixed on a ring 53 that fits inside the tank cylinder neck 3 and the part 52 opposed to this fixed part 51 is free. The six tongues present the same form and are arranged so that the set of tongues forms a cone of which extremity points inside the tank 2. A cover 9 can be placed above the cylinder neck 3. Due to the fact that the tongues presents flexibility and resilience, a downward oriented vertical contact pressure exercised on the tongues forces the flexible part of the tongues to move downward. With this downward movement, the extremities 52 move away from each other and open an aperture in the middle of all these extremities 52. As soon as the pressure contact on the tongues is stopped, the flexible extremities 52 of the tongues come back to their stand-by position, closing the top opened extremity 3 of the tank 2. These figures show that the bottom extremity 9 of the tank 2 is opened so that it can cooperate with a machine for dispensing the flowable product present inside the container 1.

Figure 3:
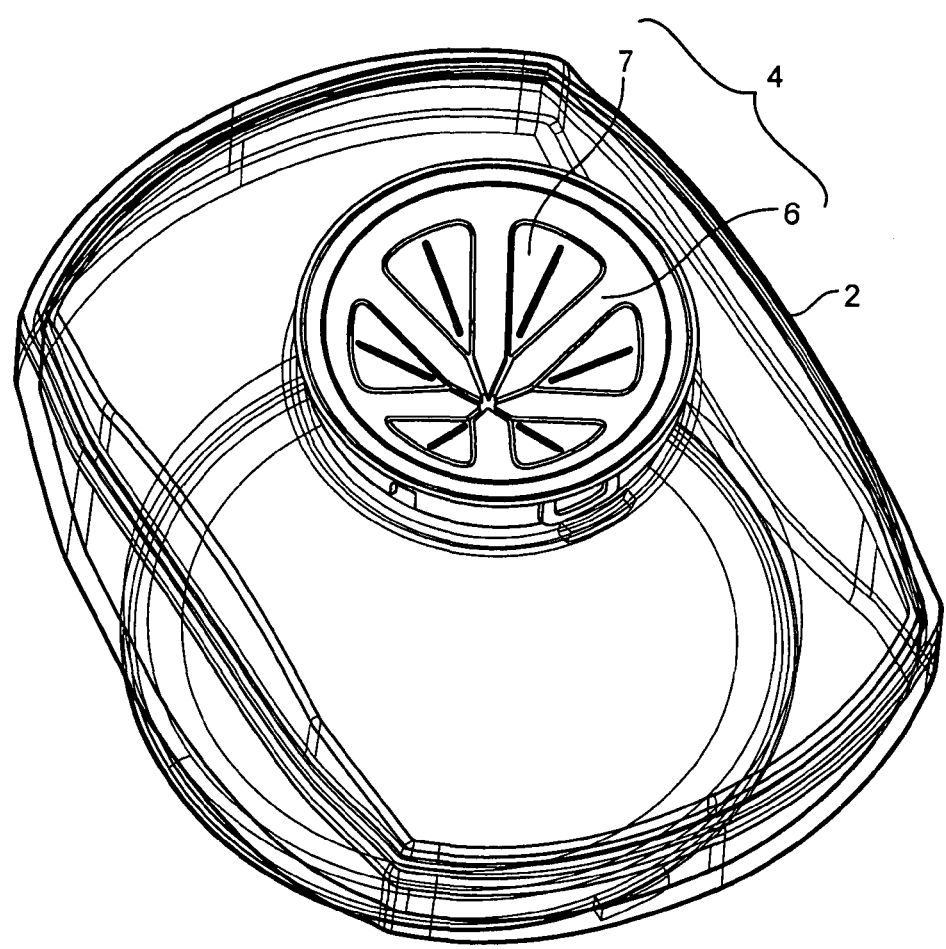
FIG. 3 is a perspective top view of the first mode of the refillable multi-dose container according to the present invention.
Figure 4A:
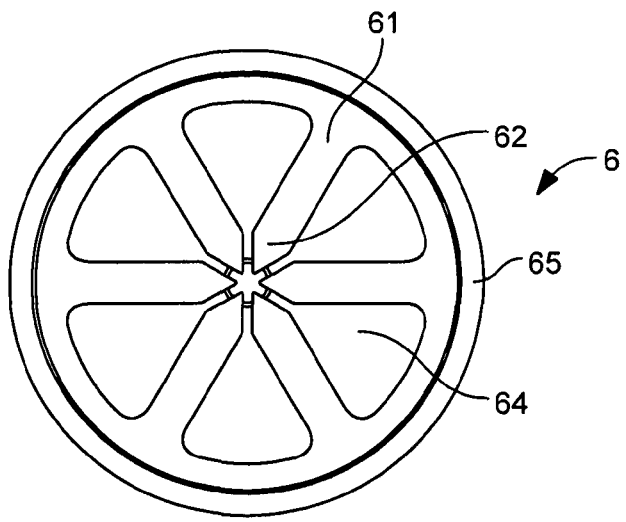
FIGS. 4a, 4b and 4c are top, bottom and side views of the top cone illustrated in FIG. 3.
Figure 4B:
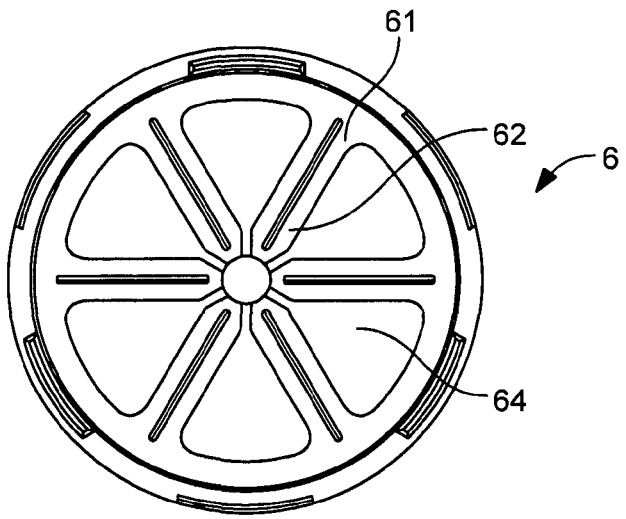
Figure 4C:
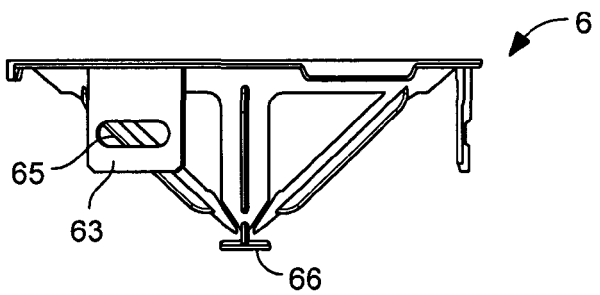
Figure 5A:
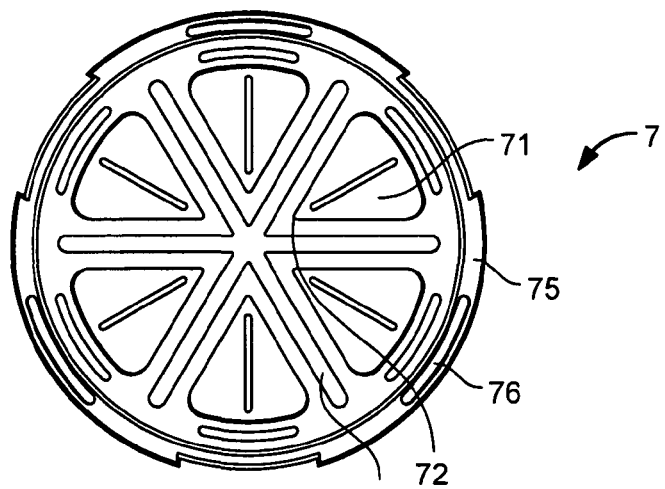
FIGS. 5a, 5b and 5c are top, bottom and side views of the bottom cone illustrated in FIG. 3.
Figure 5B:
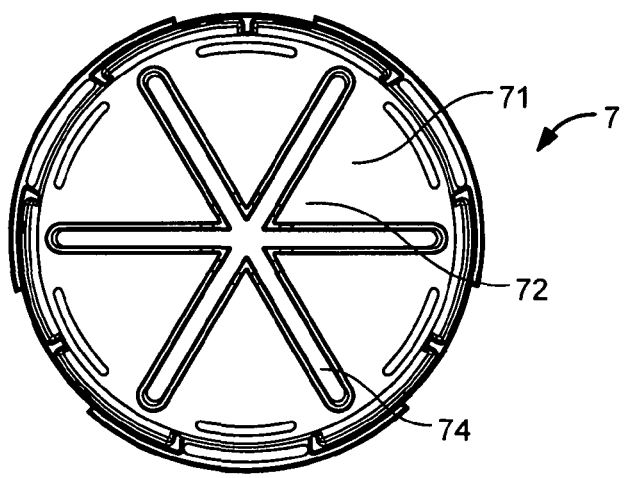
Figure 5C:
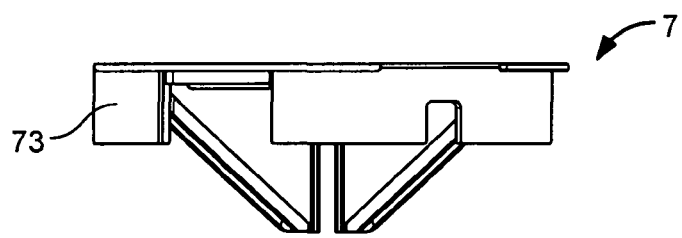

FIG. 3 illustrate the refillable multi-dose container 1 according to the first mode of the present invention. The tank 2 presents the same features as in FIGS. 1 and 2. As for the means 4 for closing the top opened extremity of the tank, it is composed of two sets 6, 7 of flexible tongues that are particularly detailed in FIGS. 4*a*, 4*b*, 4*c*, 5*a*, 5*b* and 5*c*. Each set of tongues present the form of a cone with radial apertures. It is apparent that at rest, when no pressure contact is exercised on the tongues of the cones 6, 7, the tank 2 is totally closed at its top since no aperture appears between the different tongues, each set of tongues recovering the apertures between the tongues of the other set. When a vertical downward oriented pressure is exercised on the sets, the flexible extremities of all the tongues move away from the centres of the cones and open an aperture.

The two sets 6, 7 differ in that they present different sizes for the apertures 64, 74 between the tongues. The set of tongues 7 with the smaller size of apertures is placed under the other set 6 of tongues with the bigger size of apertures. This set below 7 preferably presents apertures 74 of which circumferential length is quite inferior to the circumferential length of the tongues. The dimensions of the set above 6 are determined according to the dimensions of the set below, the tongues of the set above being sufficient large to cover the apertures of the set below at rest. For each set, one part of the tongues are fixed on a ring 65, 75 that is able to fit inside the tank top opened extremity 3. The set above 6 present fixing means 63, like hooks, for fixing its ring 65 inside the ring 75 of the set below 7 through fixing apertures 76. Each hooks can present a slot 65 able to cooperate with hooks placed at the interior of the tank top opened extremity 3. A little disk 66 can be fixed at the flexible extremity 62 of one of the tongues to confirm the feeling of the consumer that the tank is totally closed.

Figure 6:
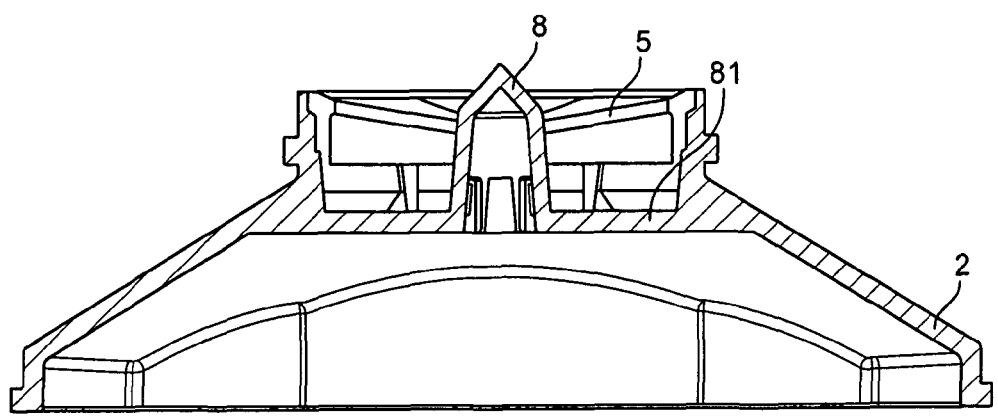
FIG. 6 is a sectional side view of the upper part of the second mode of the refillable multi-dose container according to the present invention.
Figure 7:
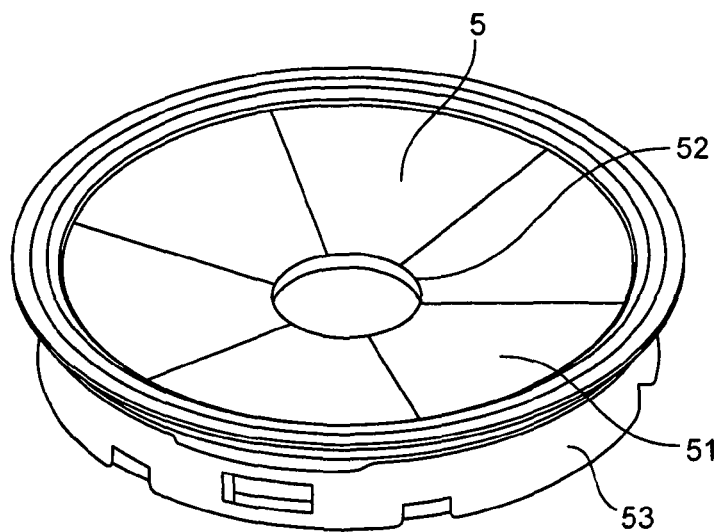
FIG. 7 is a perspective top view of the cone illustrated in FIG. 6.
Figure 8:
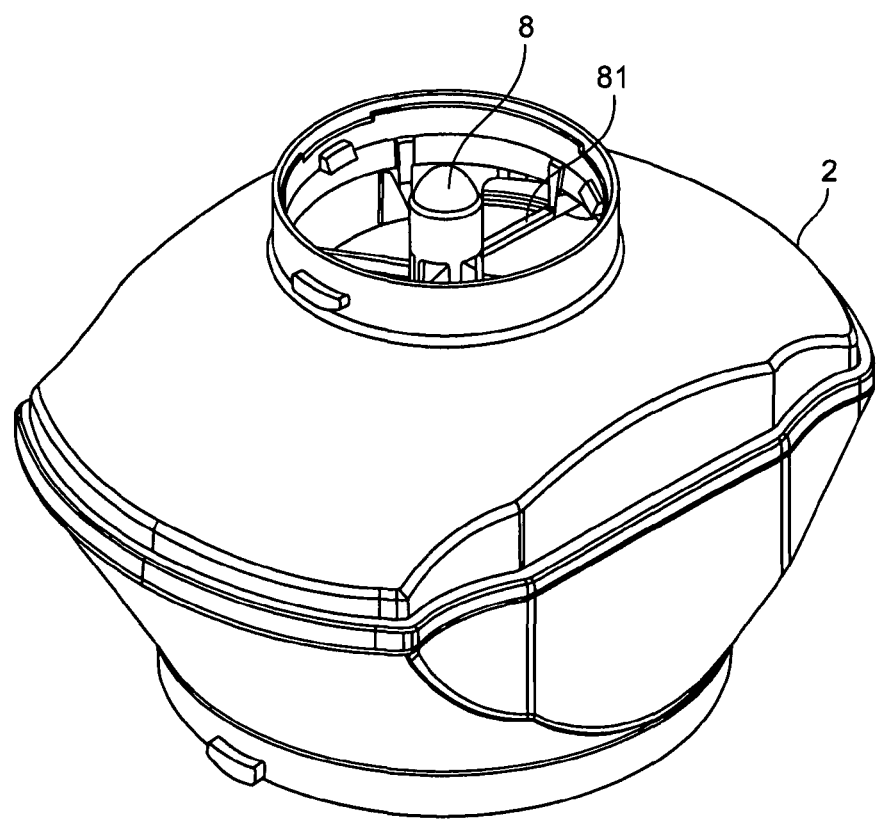
FIG. 8 is a perspective top view of the second mode of the refillable multi-dose container according to the present invention.

FIGS. 6, 7 and 8 illustrate the refillable multi-dose container 1 according to the second mode of the present invention. The means 4 closing the top opened extremity of the tank 2 consist in six flexible tongues 5 each presenting one part 51 that is fixed on a ring 53 that fits inside the tank cylinder neck 3 and one part 52 opposed to this fixed part 51 that is free. These means 4 also comprise a fixed central piece 8 in contact with the free extremities of each flexible tongues 5. The tongues and the fixed central piece 8 cooperate so that at rest the flexible tongues 5 rely on the central piece 8 and close the tank 2. This central piece can be fixed to the tank by several beams 81. When a vertical downward oriented pressure is exercised on the tongues 5, the flexible extremities 52 of all the tongues 5 move downward and away from the central piece 8. It creates six apertures between the tongues and a central circumferential aperture around the central piece 8. Yet this circumferential aperture is small compared to the central aperture that can be obtained with the other modes of the present invention. Consequently, the flow of a powder flowing through the apertures between the tongues and around the fixed central piece 8 is divided in several small flows whereas the flow of powder with the embodiments of FIGS. 1 to 5 is a unique important central flow. For powder presenting a granulometry creating an important steep bulk angle (that is fine powders) the embodiment of the second mode is preferable.

Figure 9:
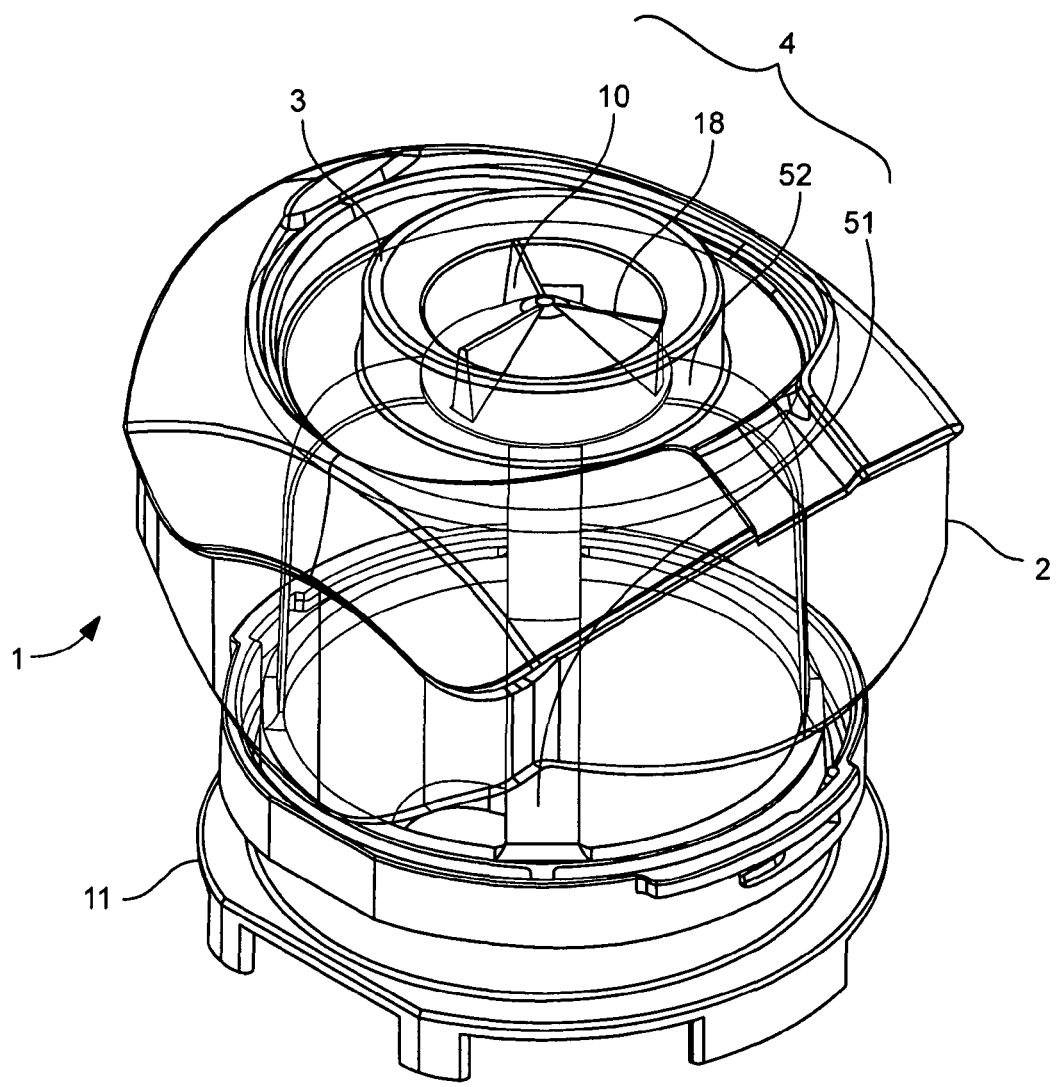
FIG. 9 is a perspective top view of the fourth mode of the refillable multi-dose container according to the present invention connected to a dosing unit.
Figure 10:
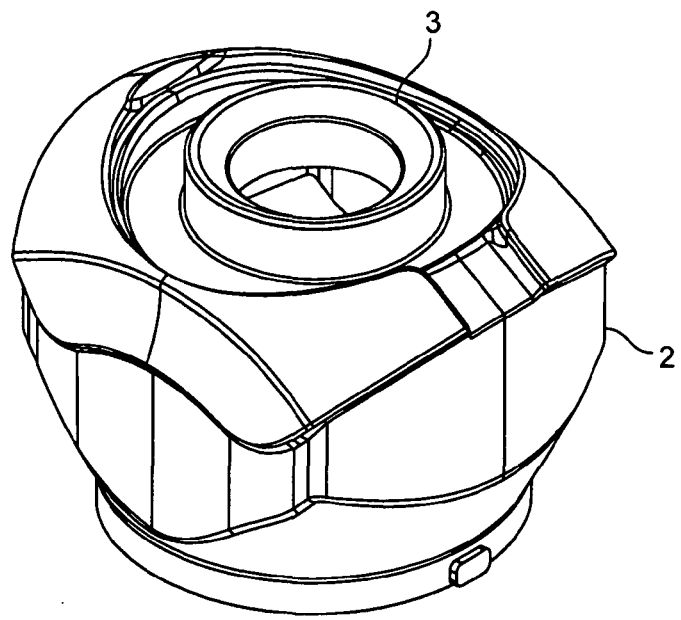
FIGS. 10 and 11 are perspective top view of the different parts illustrated in FIG. 9.
Figure 11:
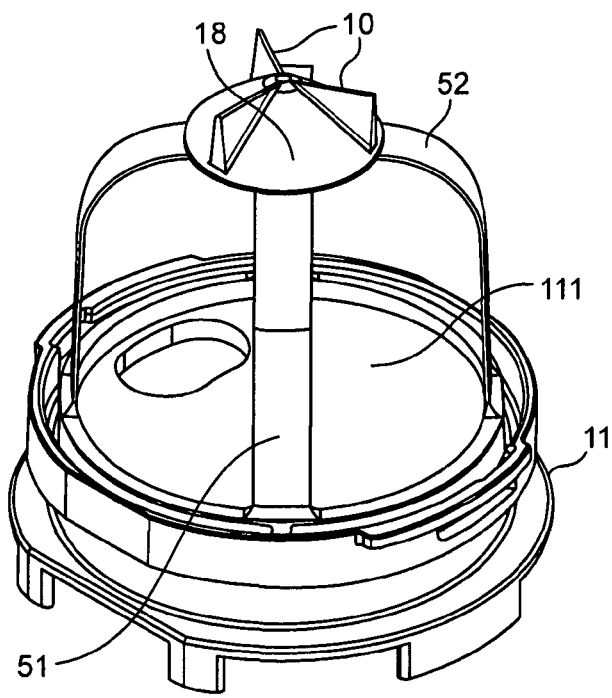

FIGS. 9 to 11 illustrate the refillable multi-dose container 1 according to the fourth mode of the present invention. The container comprises a tank 2 and means 4 for closing the top opened extremity of the tank 2. The tank 2 present a top opened extremity 3 presenting a circular section and a bottom opened extremity that cooperates with dosing means 11. The dosing means can be composed of three disks: a first disk 111 in contact with the powder storing container comprising an aperture for taking powder out of the container, a second disk for metering the powder taken out by the first part, a third disk presenting an aperture for discharging the metered dose of powder. The three disks are able to rotate around the central axis of the system, their rotation enabling either the opening or the closure of a funnel inside the dosing casing and the delivery of coffee powder in the mixing chamber of the coffee machine. The means 4 closing the top opened extremity of the tank 2 comprise four elongated flexible tongues presenting one extremity 51 fixed at one extremity to the dosing unit casing 11 and another extremity 52 that is flexible and that supports a dome-shaped cup 18. This dome-shaped cup 18 presents a larger diameter than the circular section the opening of the top opened extremity 3 of the tank and is oriented so that its exterior surface sticks to the edge of the opening of the top opened extremity of the tank 3. In the illustrated embodiment, three fins 10 are placed above the dome-shaped cup 18

Figure 12:
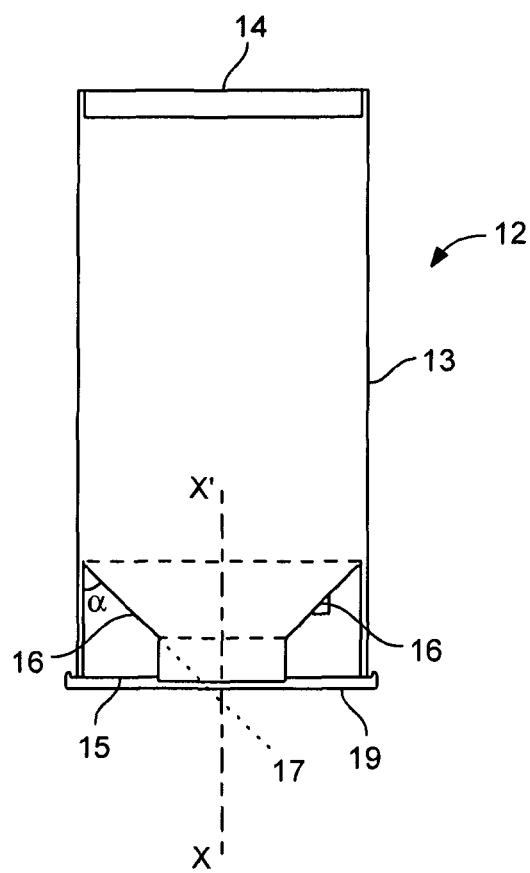
FIG. 12 is a sectional view of the container for storing the flowable beverage ingredient.

FIG. 12 illustrates in particular the container 12 for storing the flowable beverage concentrate and able to refill the refillable multi-dose container 1 of the present invention. The container comprises a vessel 13 with a closed end 14 and an opened end 15 and a hopper 16 tapering to a discharge outlet 17 in the form of a cylinder. The sections of the opened end 15 and the discharge outlet 17 are circular. The section of the discharge outlet 17 is inferior to the section of the top opened extremity 3 of the tank 2 so that the discharge outlet 17 can be pressed against the means 4 for closing the top opened extremity of the tank 2 and can apply a vertical down oriented force that forces the closing means 4 to open. In a preferred embodiment, the container 12 for storing the flowable beverage concentrate presents a tearable membrane 19 recovering the opened end 15. Preferably, the cover is tearable by exercising a contact pressure on its surface. Such a tearable function can be obtained by making small perforations through the membrane. Then the cover can present tear lines, for example straight lines intersecting at the centre of the membrane. The membrane 19 may be made of any material that is tearable, this can be at least a material chosen between: paper, aluminium and polymer sheets. The preferred membrane is a laminate of sheets of paper, polyethylene, aluminium and polyethylene according to this order. FIG. 12 supports the definition of the tapering angle $\alpha$ of the hopper corresponding to the angle between the hopper tapering wall and the hopper central axis XX'.

Figure 13:
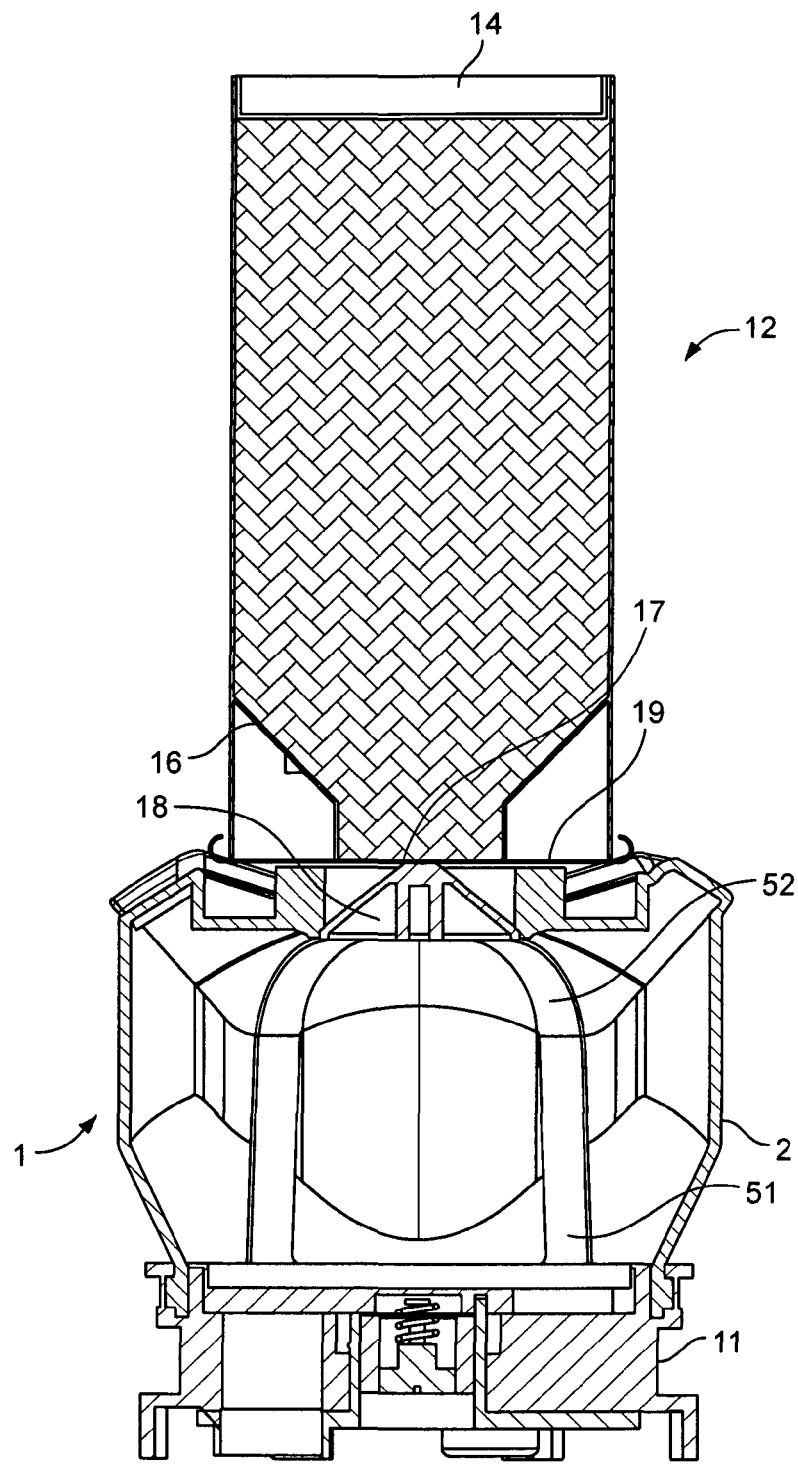
FIG. 13 is a sectional side view of the container for storing the flowable beverage ingredient and for refilling the refillable multi-dose container.

FIG. 13 illustrates the system of the present invention comprising a machine for preparing beverages starting from a flowable beverage concentrate stored in a refillable multi-dose container 1 as described above and a container 12 for storing the flowable beverage concentrate as described above used for refilling the refillable multi-dose container 1 of the machine. FIG. 13 illustrates the refilling step of the refillable multi-dose container 1 by the container 12 for storing the flowable beverage concentrate. For this refilling the container 12 for storing the flowable beverage concentrate is placed upside down above the container 1 to be refilled. The flowable product inside the container 12 for storing is facing the discharge outlet 17 and is retained by the tearable membrane 19. Due to the fact that the section of the top opened extremity 3 of the tank 2 is inferior to the section of the opened end 15 of the container 12 for refilling, the fact of pushing the container 12 for refilling against the top opened extremity 3 of the tank 2 tears on the tearable membrane that breaks and relieves the flowable product. Meanwhile, the edge of the discharge outlet 17 pushes the means 4 for closing the top opened extremity 3 of the tank 2 and opens them. Generally, the section of the extremity of the discharge outlet 17 presents is inferior to the section of the top opened extremity 3 of the tank 2 so that there is no difficulty in applying a pressure on the means 4 for closing the top opened extremity 3 of the tank 2. In the context of FIG. 13, due to this vertical down oriented force, the flexible extremities 52 of the tongues are moved downward and pull the dome-shaped-cup 18 downward, which creates a gap between the surface of dome-shaped cup 18 and the edge of the opening of the top opened extremity 3 of the tank 2 enabling the flowable product stored in the container to flow directly in the tank 2 by slipping above the surface of the dome-shaped cup 18 with limited contact with the atmosphere. The system avoids the loss of coffee powder during the tank refilling since the coffee powder is guided by the hopper 16 and the discharge outlet 17 directly in the container 1.

The same refilling can be obtained with the other refillable multi-dose container according to the other modes and presenting other types of means 4 for closing the top opened extremity of the tank. In the case of flexible tongues in the form of cone, the pressure exercised by the refilling container on the tongues forces them to move away from another and creates apertures between for the transfer of the flowable product from the refilling container to the refillable multi-dose container.

The invention claimed is:

1. A refillable multi-dose container for storing a flowable product comprising:
   a tank having a top opened extremity,
   means for closing the top opened extremity, the means being openable by exerting a contact pressure on the means and closable by terminating the contact pressure, the means for closing the top opened extremity comprise several flexible tongues, each of the tongues having a fixed extremity and a free extremity, the form and the orientation of the free extremities being such that the free extremities close the top opened extremity of the tank at rest and that the free extremities move away from one another or that the free extremities move away from the top opened extremity of the tank under a contact pressure,
   wherein the means for closing the top opened extremity of the tank comprise a fixed central piece that comprises a conical shaped part and is in contact with the free extremities of the flexible tongues.

2. The refillable multi-dose container according to claim 1, wherein the means for closing the top opened extremity of the tank are openable by exerting a vertical downwardly oriented contact pressure on the means.

3. The refillable multi-dose container according to claim 1, wherein each of the tongues has a width that decreases as the tongues extend from the fixed extremity to the free extremity.

4. The refillable multi-dose container according to claim 1, wherein when at rest the flexible tongues form a cone, the top of which is oriented to an interior side to the tank.

5. The refillable multi-dose container according to claim 1, wherein the means for closing the top opened extremity of the tank comprise two sets of the several flexible tongues, each of the sets of the flexible tongues forming a cone with pierced apertures, the two sets of the flexible tongues comprise a first set and further comprise a second set that is positioned under the first set, and the tongues of the first set cover the apertures of the second set.

6. The refillable multi-dose container according to claim 5, wherein the apertures of the first set of the flexible tongues are wider relative to the apertures of the second set of the flexible tongues.

7. The refillable multi-dose container according to claim 1 comprising the means for closing is a cover above the top opened extremity.

8. The refillable multi-dose container according to claim 7 wherein:
   the top opened extremity is a cylinder neck comprising:
   an external thread for cooperating with a thread of the cover,
   an internal thread for cooperating with a thread of the means for closing the top opened,
   the cover and the means for closing the top opened extremity comprise connection means so that when the cover is respectively screwed up or down around the cylinder neck, the means for closing the top opened extremity of the tank are screwed up or down inside the cylinder neck, and
   said the connection means being releasable when the cover and the means for closing the top opened extremity are screwed up to their highest position.

9. The refillable multi-dose container according to claim 1, wherein the fixed extremities of the tongues are hooked near the bottom of the tank.

10. The refillable multi-dose container according to claim 9, wherein the free extremities of the flexible tongues support clogging means, the form and the orientation of the clogging means being such that they close the top opened extremity.

11. The refillable multi-dose container according to claim 10, wherein the clogging means are a dome-shaped cup.

12. The refillable multi-dose container according to claim 1, wherein the tank comprises a bottom opened extremity that cooperates with dosing means.

13. A machine for preparing beverage from a flowable beverage ingredient comprising:
   a refillable multi-dose container for storing a flowable product comprising a tank having a top opened extremity, and a closure for the top opened extremity, the closure comprising (i) a plurality of flexible tongues, each tongue having a free extremity, and (ii) a fixed central piece that comprises a conical shaped part and is in contact with the free extremities of the plurality of flexible tongues of the closure, the closure opening upon the exertion of a contact pressure on the closure and closing upon termination of the contact pressure;

a dosing unit comprising dosing means;
diluent feeding means; and
means for mixing a dose of flowable beverage ingredient and diluent.

14. A system for preparing beverages by mixing of a flowable beverage concentrate with a diluent comprising:
a machine comprising:
   a refillable multi-dose container for storing a flowable product comprising a tank having a top opened extremity, and a closure for the top opened extremity, the closure comprising (i) a plurality of flexible tongues, each tongue having a free extremity, and (ii) a fixed central piece that comprises a conical shaped part and is in contact with the free extremities of the plurality of flexible tongues of the closure, the closure opening upon the exertion of a contact pressure on the closure and closing upon termination of the contact pressure,
   a dosing unit comprising dosing means,
   diluent feeding means, and
   means for mixing a dose of flowable beverage concentrate and the diluent; and
a container for storing the flowable beverage concentrate and refilling the refillable multi-dose container of the machine, said container comprising:
   a vessel presenting a closed end and an opened end, and
   a hopper inside the vessel and tapering to a discharge outlet in a direction of the vessel opened end, the discharge outlet being able to push the means for closing the top opened extremity of the tank of the refillable multi-dose container.

15. The system according to claim 14, where the discharge outlet of the container for storing the flowable beverage concentrate comprises a section that is smaller than a section of the top opened extremity of the refillable multi-dose container of the machine.

16. The system according to claim 14, wherein the container for storing the flowable beverage ingredient comprises a tearable membrane closing the hopper and the vessel.

17. The system according to claim 14, wherein the refillable multi-dose container is refilled by pushing the discharge outlet of the container for storing the flowable beverage concentrate against the closure in order to open the top opened extremity.

18. The system according to claim 16 where the refillable multi-dose container is refilled by pushing the discharge outlet of the container for storing the flowable beverage concentrate against the closure in order to open the top opened extremity and simultaneously break the tearable membrane of the container for storing the flowable beverage ingredient.

* * * * *